(12) United States Patent
Crable et al.

(10) Patent No.: US 8,310,958 B2
(45) Date of Patent: Nov. 13, 2012

(54) ROUTING CALLS IN A NETWORK

(75) Inventors: Phillip D. Crable, Falcon, CO (US);
David E. Phelps, Colorado Springs, CO (US); Brian S. Badger, Divide, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1106 days.

(21) Appl. No.: 11/617,232

(22) Filed: Dec. 28, 2006

(65) Prior Publication Data
US 2008/0159262 A1 Jul. 3, 2008

(51) Int. Cl.
*H04L 12/16* (2006.01)

(52) U.S. Cl. .......................... 370/259; 710/316; 379/242

(58) Field of Classification Search .................. 370/259, 370/236, 352, 328, 262, 271, 261, 392; 709/227, 709/200, 226, 218
See application file for complete search history.

(56) References Cited

U.S. PATENT DOCUMENTS

| | | | |
|---|---|---|---|
| 6,735,621 B1 * | 5/2004 | Yoakum et al. ................ | 709/218 |
| 2002/0143874 A1 | 10/2002 | Marquette et al. | |
| 2003/0021264 A1 * | 1/2003 | Zhakov et al. ................ | 370/352 |
| 2003/0108002 A1 * | 6/2003 | Chaney et al. ................ | 370/261 |
| 2003/0149774 A1 * | 8/2003 | McConnell et al. .......... | 709/227 |
| 2005/0155036 A1 * | 7/2005 | Tiainen et al. ................ | 719/310 |
| 2006/0002327 A1 * | 1/2006 | Kallio et al. .................. | 370/328 |
| 2006/0026288 A1 * | 2/2006 | Acharya et al. ............... | 709/227 |
| 2006/0242300 A1 * | 10/2006 | Yumoto et al. ................ | 709/226 |
| 2007/0121515 A1 * | 5/2007 | Donovan et al. .............. | 370/236 |
| 2007/0136413 A1 * | 6/2007 | Ishikawa et al. .............. | 709/200 |
| 2008/0086564 A1 * | 4/2008 | Putman et al. ................ | 709/227 |
| 2010/0015958 A1 * | 1/2010 | Dell'Uomo et al. ........ | 455/414.1 |
| 2010/0030905 A1 * | 2/2010 | Fikouras et al. .............. | 709/228 |
| 2010/0061277 A1 * | 3/2010 | Brown et al. .................. | 370/271 |
| 2010/0111087 A1 * | 5/2010 | Lindgren et al. .............. | 370/392 |
| 2010/0281124 A1 * | 11/2010 | Westman et al. ............. | 709/206 |

* cited by examiner

Primary Examiner — Dang Ton
Assistant Examiner — Lionel Preval

(57) ABSTRACT

A method includes receiving a session initiation protocol (SIP) invite message and identifying a particular service associated with the SIP invite message. The method may also include identifying a destination for the SIP invite message using status information associated with a number of servers and forwarding the SIP invite message to the destination. The method may also further include identifying a first application server based on the SIP invite message and allocation information associated with allocating traffic among a number of application servers.

17 Claims, 6 Drawing Sheets

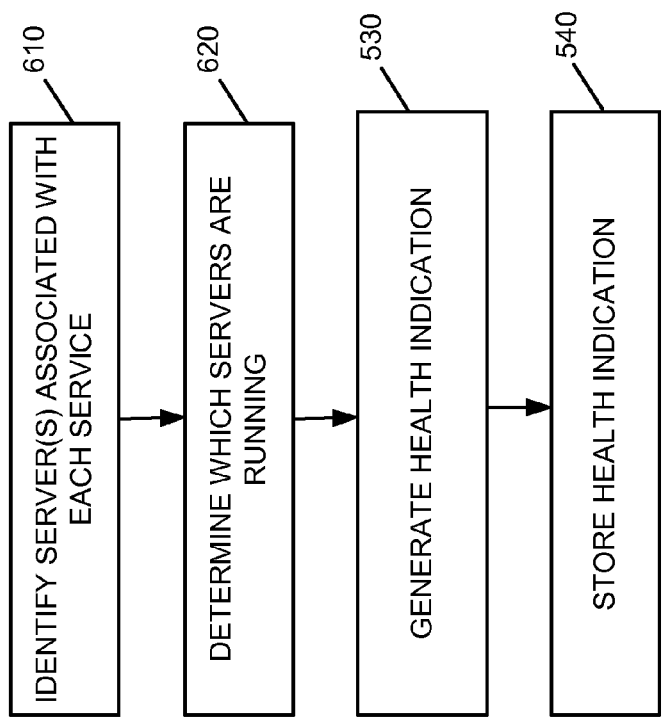

ROUTING CALLS IN A NETWORK

BACKGROUND INFORMATION

Telecommunication service providers have been increasing the number of services available to subscribers, such as voice over Internet Protocol (VoIP) related services. As a result, the volume of traffic has greatly increased for telecommunication service providers.

BRIEF DESCRIPTION OF THE DRAWINGS

FIGS. 4-6 illustrate exemplary processing by various devices illustrated in FIG. 1.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention. Instead, the scope of the invention is defined by the appended claims and their equivalents.

Implementations described herein relate to routing messages and data traffic in a network supporting a number of telecommunication services. The network architecture may allow for routing messages to an available server and for managing degraded or failed services. The network architecture may also allow for routing messages between various services.

Figure 1:
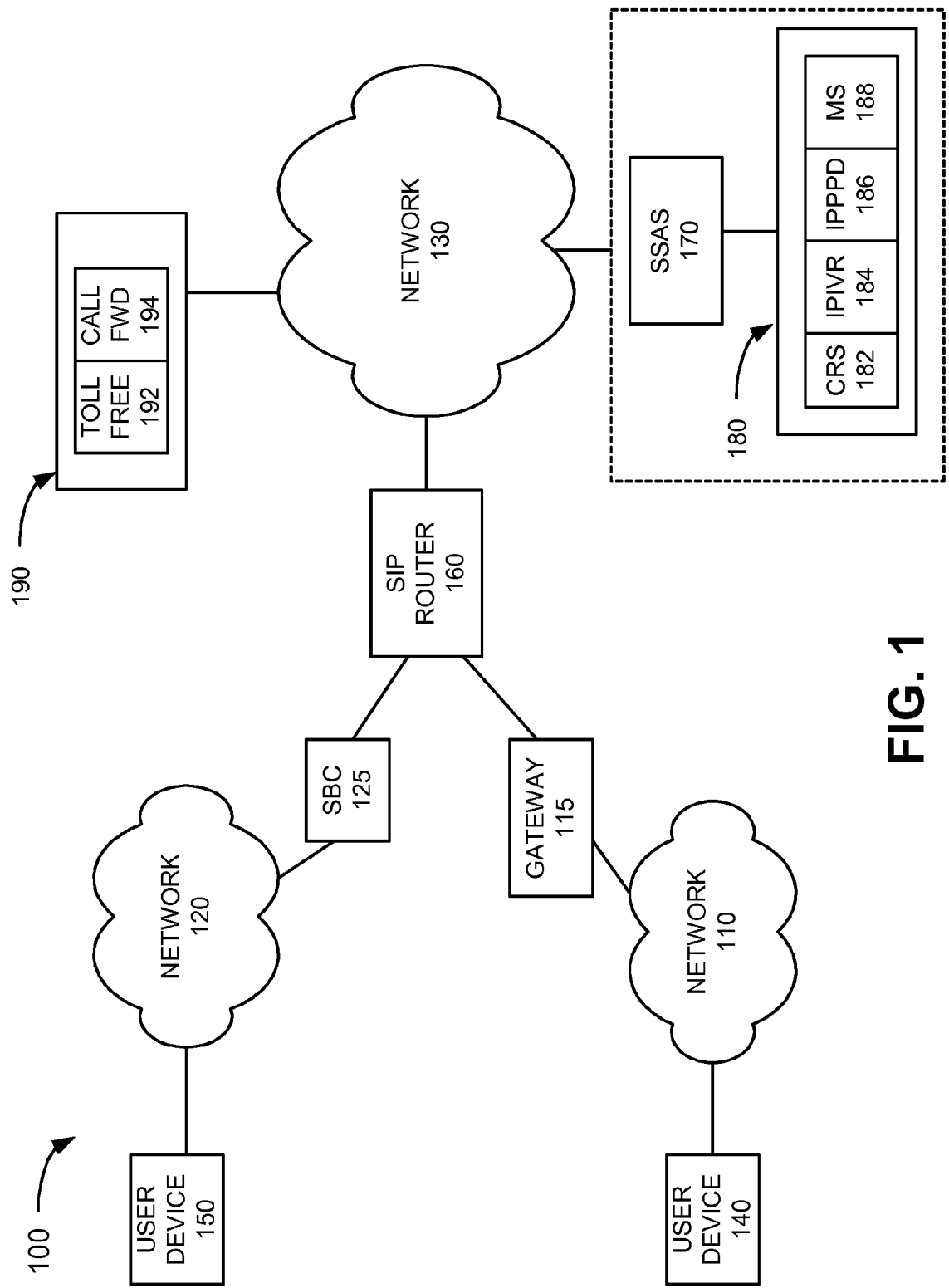
FIG. 1 illustrates an exemplary network in which systems and methods described herein may be implemented.

FIG. 1 is a block diagram of an exemplary network 100 in which systems and methods described herein may be implemented. Network 100 may include networks 110, 120 and 130, gateway 115, session border controller (SBC) 125, user devices 140 and 150, session initiation protocol (SIP) router 160, service selection application server (SSAS) 170, and services 180 and 190. The exemplary configuration illustrated in FIG. 1 is provided for simplicity. It should be understood that a typical network may include more or fewer devices than illustrated in FIG. 1.

Network 110 may include one or more circuit switched networks, such as, for example, a public switched telephone network (PSTN) or other types of switched networks. Network 110 may also include one or more local telephone networks, one or more long distance networks and/or one or more wireless networks.

Network 120 may include one or more packet switched networks, such as the Internet, an intranet, a local area network (LAN), a wide area network (WAN), or another type of network that is capable of transmitting data from a source device to a destination device. Network 120 may also include one or more wireless networks for receiving wireless signals and forwarding the wireless signals toward the intended destination.

Network 130 may include a packet switched network, such as a LAN, a WAN, an IP network, such as the Internet, an intranet, etc., or another type of network. In an exemplary implementation, network 130 may be associated with a telecommunications service provider that provides various services to callers, such as callers at user devices 140 and 150. Network 130 may be used to forward calls to the appropriate components in network 100, as described in detail below.

Gateway 115 may include one or more devices, such as routers, switches, etc., that allow divergent transport networks to communicate and cooperatively carry traffic. For example, gateway 115 may provide for interoperation at two levels, e.g., between different signaling schemes and between different media forms. In one instance, gateway 115 may adapt between SS7 signaling of network 110 and SIP or H.323 protocols used by network 130. Gateway 115 may also adapt analog or pulse code modulation (PCM) encoded voice signals to a packetized data stream suitable for transport over network 130.

SBC 125 may include one or more SBCs that provide control of the boundary between different service provider networks (e.g., between networks 120 and 130), provide signaling protocol inter-working between the IP-based network 130 and other service provider networks, control the transport boundary between service provider networks, and provide usage metering and Quality of Service (QoS) measurements for media flows. In one implementation, SBC 125 may correspond to an ingress point to SIP router 160.

User device 140 may include any conventional telephone that interfaces with the PSTN to place and receive telephone calls. User device 140 may be a standard telephone, a cordless telephone, a cellular telephone or any other type of conventional telephone.

User device 150 may include any device that is able to transmit and/or receive IP based data. For example, user device 150 may include a personal computer (PC), a laptop, a personal digital assistant (PDA) or a web-based appliance that is able to transmit and receive IP data via a network, such as network 120. The IP data may include text data, video or image data, email data, voice data, etc. In an exemplary implementation, user device 150 may transmit voice data via network 120 using voice over Internet protocol (VoIP). For example, user device 150 may be a SIP-based telephone device or another VoIP-based telephone device. A SIP-based telephone device may also include a software client that may run, for example, on a conventional PC, laptop computer or other computing device. User device 150 may also include any wireless device, such as a cellular telephone, a PDA or a pager that executes a wireless application protocol (WAP), or another protocol, that enables user device 150 to transmit and receive voice data and/or text and images via network 120.

SIP router 160 may include a router or other network device that acts as a proxy for handling and processing user requests. For example, gateway 115, SBC 125, and various application servers in network 100 may forward requests to SIP router 160. SIP router 160 may screen these requests to determine what services are being invoked and forward the requests to the appropriate device(s). SIP router 160 may also allocate traffic between various servers that implement the desired service to balance the load and/or to avoid servers that may be out of service, as described in detail below.

SSAS 170 may include one or more servers that receive requests forwarded from SIP router 160, control access to services 180 and generate routing decisions based on the received requests. For example, SSAS 170 may screen a number of elements in a SIP Invite message, such as an originating service header and an asserted identity header. SSAS 170 may also allocate a percentage of traffic associated with a particular service to a particular device that provides the desired service, as described in detail below.

Services 180 may include a number of components that provide services to callers, such as callers at user devices 140 and 150. For example, services 180 may include VoIP related services, such as core routing service (CRS) 182, IP interactive voice response (IVR) service 184, IP prepaid (PPD) service and media services (MS) 188. Other services (not shown), such as, for example, a software-based automatic call distributor (ACD), may be included in services 180. Each of the individual services illustrated in services 180 may include one or more servers that are associated with providing the particular service.

Services 190 may include a number of components that provide additional services to callers. For example, services 190 may include a toll free service 192 and a call forwarding service 194. Other services (not shown) may be included in services 190. Each of the individual services illustrated in services 190 may include one or more servers that are associated with providing the particular service The elements shown in the dotted box in FIG. 1 may be associated with a particular platform and/or site provided by a telecommunication service provider. The services included in services 190 may include other services provided by another platform and/or site of the same telecommunication service provider. SIP router 160 and SSAS 170 may interact to route calls to the desired services (e.g., services 180 and 190), as described in detail below. SIP router 160 and SSAS 170 may also route calls between services, based on the particular call requirements, as described in detail below.

SIP router 160 and SSAS 170 are shown as separate components in FIG. 1. In other implementations, the functions performed by SIP router 160 and SSAS 170, described in more detail below, may be performed by a single device/platform.

Figure 2:
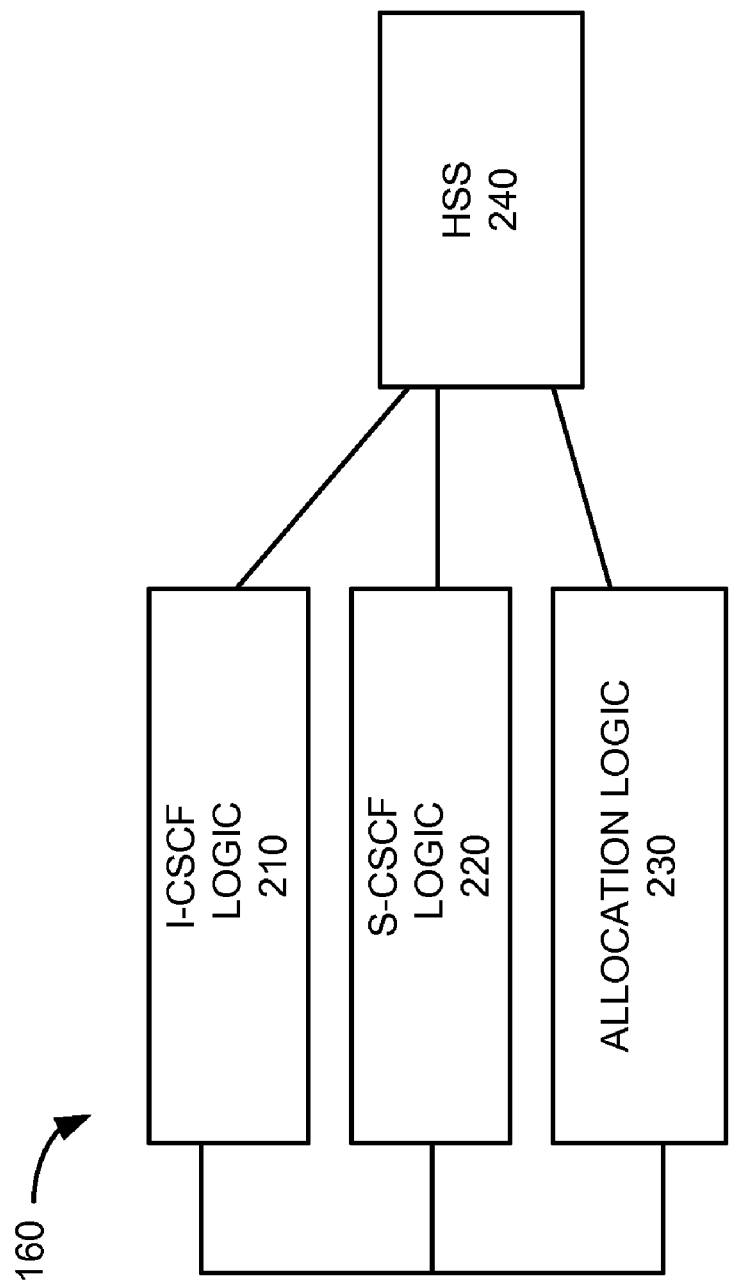
FIG. 2 illustrates an exemplary configuration of the router of FIG. 1.

FIG. 2 illustrates an exemplary configuration of SIP router 160. Referring to FIG. 2, SIP router 160 may include interrogating call session control function (I-CSCF) logic 210, serving call session control function (S-CSCF) logic 220, allocation logic 230 and home subscriber server (HSS) 240.

I-CSCF logic 210 and S-CSCF logic 220 may be call session control components responsible for parsing a session (e.g., a SIP session) and applying logic (e.g., business logic, service logic, operational logic, etc.) on a per event basis. The outcome of the session control may be to route a call or an event to the appropriate components in network 100, append SIP headers and values to a message, etc.

In an exemplary implementation, I-CSCF logic 210 may act as the main point of contact for connections to subscribers served by other IP networks. For example, I-CSCF logic 210 may receive SIP messages and identify the next hops for the SIP messages. To achieve this, I-CSCF logic 210 may query HSS 240 for the location (e.g., an address) to which a particular SIP message is to be forwarded.

S-CSCF logic 220 may perform session control and registration services for the users desiring services, such as any of services 180 and 190. S-CSCF logic 220 may access a user profile from HSS 240 and route sessions requested by a user (also called a "subscriber"). Additionally, S-CSCF logic 220 may perform user authentication based on information from HSS 240.

In some implementations, S-CSCF logic 220 may include a Service Capability Interaction Manager (SCIM) and Resource Management (RM) functions. The SCIM may be responsible for orchestrating the offerings of one or more application services across various service enabling technologies and platforms to produce valued services for users. The RM may be responsible for executing business rules and service level agreements (SLAs) by allocating the appropriate resources.

Allocation logic 230 may allocate traffic to various devices, such as SSAS 170, to balance traffic among devices in network 100. For example, allocation logic 230 may allocate traffic to one of a number of SSASs 170 to balance overall load, as described in more detail below.

HSS 240 may include one or more servers that act as the central repository for user-related information. For example, HSS 240 may contain user-related subscription information for handling multimedia sessions. Some of the information contained in HSS 240 may include information identifying the location of a particular S-CSCF logic 220 for a particular user. HSS 240 may also include user profile information that contains service trigger points and the corresponding resources (e.g., applications, media, services, etc.) that offer the services. The user profile information may be accessed and/or forwarded to S-CSCF logic 220 for session control and service treatment. HSS 240 may also provide and receive updates directly from various application servers (not shown).

SIP router 160, as described above, screens incoming messages to determine which services are to be invoked. SIP router 160 also determines a percentage allocation of traffic among servers that implement the desired service. The components in SIP router 160 may include software instructions contained in a computer-readable medium, such as a memory. A computer-readable medium may be defined as one or more memory devices and/or carrier waves. The software instructions may be read into memory from another computer-readable medium or from another device via a communication interface. The software instructions contained in memory may cause the various logic components to perform processes that will be described later. Alternatively, hardwired circuitry may be used in place of or in combination with software instructions to implement processes consistent with the exemplary embodiments. Thus, systems and methods described herein are not limited to any specific combination of hardware circuitry and software.

Figure 3:
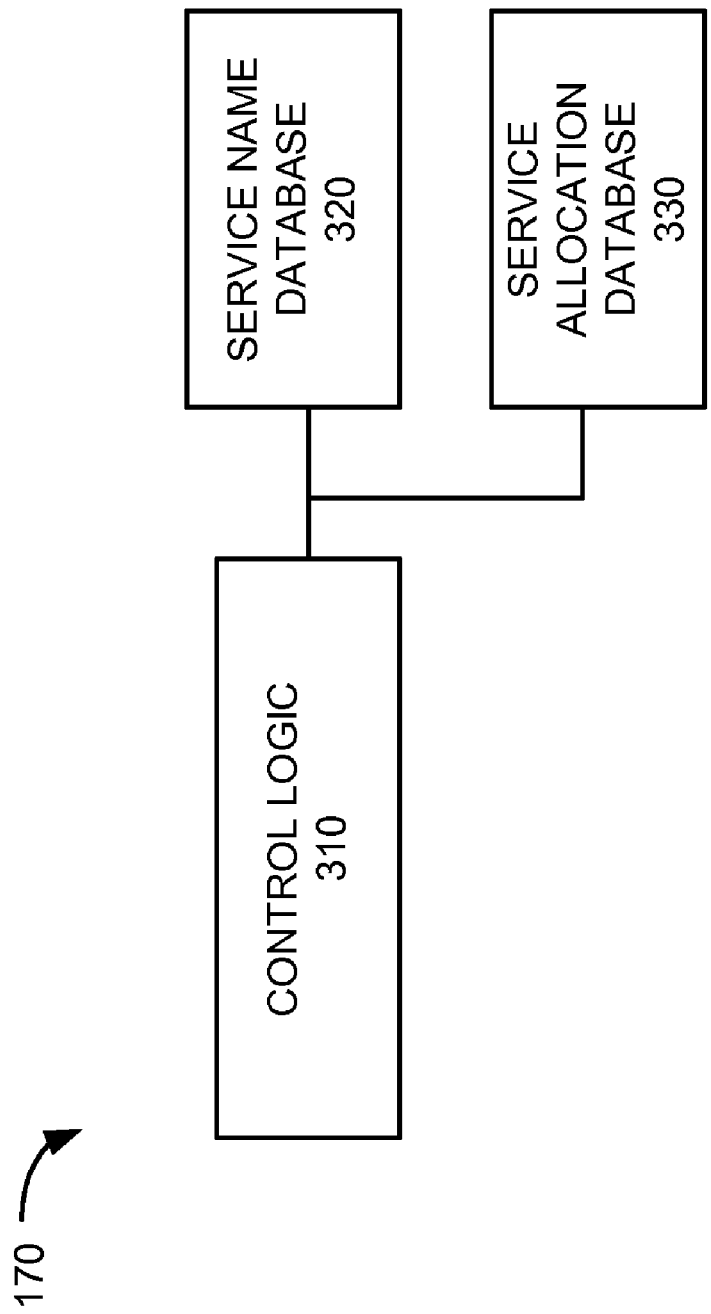
FIG. 3 illustrates an exemplary configuration of the service selection application server of FIG. 1.

FIG. 3 illustrates an exemplary configuration of SSAS 170. Referring to FIG. 3, SSAS 170 may include control logic 310, service name database 320 and service allocation database 330. The configuration in FIG. 3 is provided for simplicity. It should be understood that additional components and/or different components may be included in SSAS 170.

Control logic 310 may include logic for screening incoming messages to identify destinations for the messages and logic for routing the messages to the identified destinations. For example, control logic 310 may screen the header of an SIP Invite message to identify whether a proprietary header of, for example, "Orig-Service" is present. This header may identify an originating service associated with the incoming message, as opposed to an originating user. An example of a proprietary header may be an IPIVR outdial header associated with IPIVR service 184. This header may indicate that specific behavior may be expected based on the originating service.

If the originating service is not present, control logic 310 may screen on the P-Asserted-Identity included in the header. Control logic 310 may use the P-Asserted-Identity to identify a uniform resource identifier (URI) associated with the caller.

Service name database 320 may store data used by control logic 310 to map a request URI to a service name URI. Service allocation database 330 may store data used by control logic 310 to route traffic to the appropriate services (e.g., services 180 and 190). For example, control logic 310 may access service allocation database 330 to determine the percentage of traffic associated with a particular service to allocate to the appropriate services and/or micro-services needed to implement the service based on the service name URI.

As will be described in detail below, SSAS 170 may perform processing associated with routing calls to and from various parties. The components in SSAS 170 may include software instructions contained in a computer-readable medium, such as a memory. A computer-readable medium may be defined as one or more memory devices and/or carrier waves. The software instructions may be read into memory from another computer-readable medium or from another device via a communication interface. The software instructions contained in memory may cause the various logic components to perform processes that will be described later. Alternatively, hardwired circuitry may be used in place of or in combination with software instructions to implement processes consistent with the exemplary embodiments. Thus, systems and methods described herein are not limited to any specific combination of hardware circuitry and software.

Figure 4:
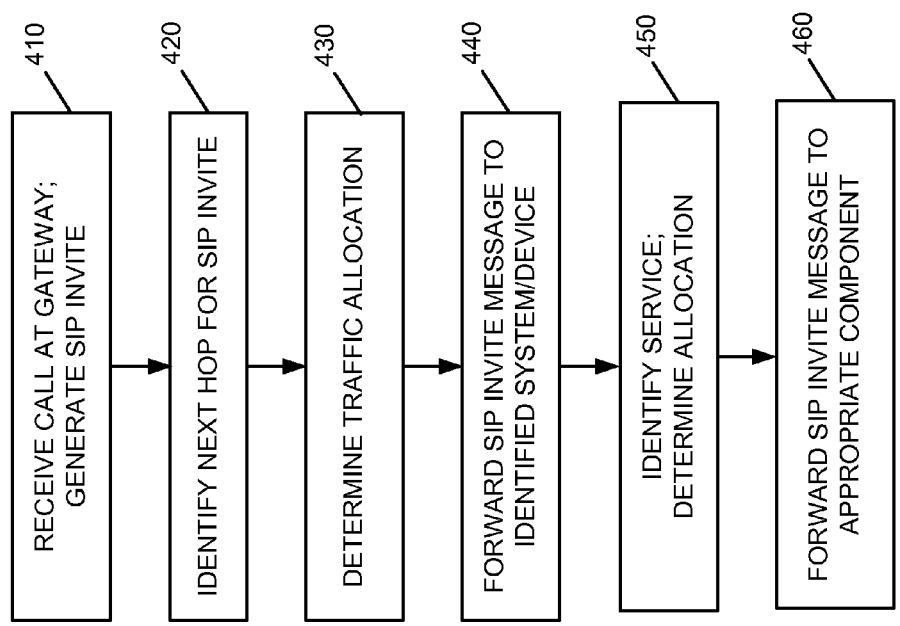

FIG. 4 is a flow diagram illustrating exemplary processing associated with routing calls in network 100. In this example, assume that the call is associated with an IPIVR service. The call may arrive, for example, from an external origination, such as user device 140 or user device 150 via gateway 115 or SBC 125, respectively. In this example, assume that the call is received from user device 140 via network 110 and gateway 115. Gateway 115 may receive an incoming initial address message (IAM) associated with the call and generate a SIP Invite message (act 410). Gateway 115 may then send the SIP Invite message to any router provisioned in its local tables as being capable of handling a SIP Invite message. In this example, assume that gateway 115 sends the SIP Invite message to SIP router 160.

SIP router 160 receives the SIP Invite message. SIP Router 160 may then identify the next hop or component in network 100 to which the SIP Invite message is to be sent (act 420). For example, SIP router 160 may determine that the SIP Invite message includes a P-Asserted-Identity header identifying the caller as a subscriber to services provided by a telecommunication service provider associate with one of services 180 and 190. In this case, I-CSCF logic 210 may examine the domain received in the P-Asserted-Identity header to determine if SIP router 160 handles the domain for that particular requested service. If no domain name is present (e.g., IP address), SIP router 160 may further screen the request.

For example, I-CSCF logic 210 may perform a lookup using the P-Asserted-Identity header in HSS 240. In this call flow example, assume that no origination services are to be provided and therefore, no match will be found for this particular call. I-CSCF logic 210 may also examine the domain received in the request URI to determine whether the request URI is associated with a domain that SIP router 160 handles.

I-CSCF logic 210 may also examine the domain receive in the request URI by performing a lookup in HSS 240. Assume that the request URI is associated with a domain handled by SIP router 160. In this case, HSS 240 may return the name of the next service identifying where this SIP Invite message should be forwarded. Allocation logic 230 may then perform a lookup using the service name in its local database (not shown) and identify information associated with each autonomous system that is configured to handle the particular service. Allocation logic 230 may also send the SIP Invite message to the particular autonomous system based on the percentage of traffic to be allocated to each autonomous system.

For example, a number of autonomous systems may be configured to handle the particular service. In this case, allocation logic 230 may store information identifying what percentage of overall traffic should be forwarded to each of these autonomous systems (act 430). In this manner, SIP router 160 may balance the load among a number of different systems.

In this example, assume that allocation logic 230 identifies SSAS 170 as the autonomous system to which the call should be forwarded. SIP router 160 may then forward the SIP Invite message to SSAS 170 (act 440).

SSAS 170 may receive the SIP Invite message. SSAS 170 may then examine the domain in the P-Asserted-Identity header to determine if SSAS 170 handles the particular domain associated with the SIP Invite message and determine if origination services are to be provided. In this example, assume that SSAS 170 handles the domain in the P-Asserted-Identity header and that no origination services are to be provided.

SSAS 170 may also examine the request URI to determine if the request URI corresponds to a "token" used by the telecommunications service provider associated with services 180 and 190. The token may be used to identify a particular service. If the request URI corresponds to a token, SSAS 170 performs a lookup in a token data storage (TDS) system (not shown) to identify a URI that will be used to determine the particular service. In this example, assume that the request URI corresponds to a token. SSAS 170 forwards the token to the TDS to identify a URI associated with the token and receives the URI from the TDS.

SSAS 170 may then examine the URI to identify the service associated with that particular URI (act 450). For example, SSAS 170 may perform a lookup in service name database 320 using the received URI. In this example, assume that the SSAS 170 identifies IPIVR 184 as the appropriate service corresponding to the request URI. SSAS 170 may then determine an allocation with respect to IPIVR 184 (act 450).

For example, control logic 310 may access service allocation database 330 using the service name to identify a percentage allocation and route associated with the service. For example, service allocation database 330 may indicate that 40% of traffic is to go to a first server associated with IPIVR 184, 35% is to go to a second server and 25% is to go to a third server. Service allocation database 330 may also store information indicating how much of recent traffic has been routed to each of the servers. Control logic 310 may use the information stored in service allocation database 330 to indicate where to send the SIP Invite message. In this manner, control logic 310 may balance the traffic among the plurality of servers that perform the particular service. In this example, assume that control logic 310 identifies the first server as being the appropriate location. SSAS 170 may then forward the SIP Invite message to the first server associated with IPIVR 184 (act 460).

In some implementations, one or more of the servers associated with IPIVR 184 may be located on the same physical site as SSAS 170. In this case, control logic 310 may determine whether it can forward all of the traffic to the server associated with IPIVR 184 at its own physical site. That is, control logic 310 may determine if the local server associated with IPIVR 184 has the capacity to handle all the traffic received by SSAS 170 requiring IPIVR related services. If so, SSAS 170 may favor the local server that is able to service the request. That is, SSAS 170 may keep the traffic at its own local site as opposed to routing the request to another site. This may reduce network congestion associated with forwarding requests and/or data to other sites. If less than 100% of the traffic may be handled at the local or internal site, SSAS 170 may forward the portion of traffic that cannot be handled locally to other physical sites.

IPIRVR 184 may receive the SIP Invite message and process the SIP Invite message to provide the desired service. In this case, IPIVR 184 may provide a particular IVR application, such as an application for directory assistance program. In this case, IPIVR 184 may include an IVR menu and may interact with a caller to provide the desired service/information.

In other cases, the service or feature processing associated with the SIP Invite message may involve another one of services 180 or another VoIP related service, such as text-to-speech conversion, automatic speech recognition, multimedia conferencing, etc. In each case, SSAS 170 may forward the request to the appropriate element in network 100 to perform the desired service. Services recognized by SSAS 170 may include micro services and macro services. Micro services may include re-usable building block services such as, for example, text-to-speech conversion, automatic speech recognition and multi-media conferencing. In some instances, macro services can be implemented or realized by a combination of micro services to perform a particular service.

In the example above, SIP router 160 and SSAS 170 interact to forward a request to a particular server associated with providing a service. In some implementations, a request may require a number of services, such as one of services 180 and another of services 190, as described in detail below.

Figure 5:
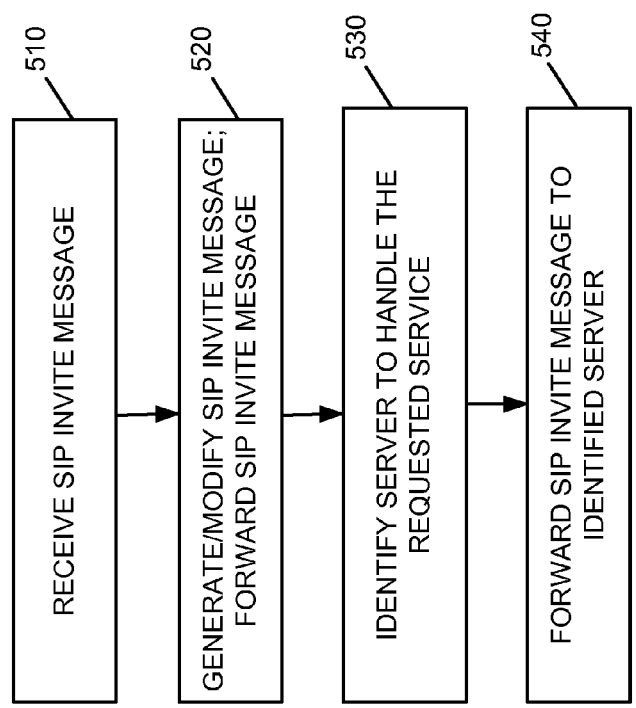

FIG. 5 illustrates exemplary processing associated with providing multiple services associated with a single call, also referred to as a call flow. In this example, assume that the call flow involves IPIVR 184 and toll free service 192. Such a call flow may involve a request for directory assistance handled by IPIVR 184 followed by outdialing a toll free number (e.g., an 800 number).

Processing may proceed similar to that described above with respect to FIG. 4. For example, IPIVR 184 may receive the SIP Invite message from SSAS 170 (act 510) in a similar manner as that described above with respect to FIG. 4. Further assume that after interacting with the caller, IPIVR 184 identifies an 800 number URI to which a user would like to be connected. IPIVR 184 may then modify the received SIP Invite message or create a new SIP message (act 520). For example, IPIVR 184 may generate a SIP Invite message that includes the 800 number URI in the header of the message. IPIVR 184 may also copy the P-Asserted-Identity header and "From" fields from the original inbound leg of the call to the SIP Invite message. IPIRVR 184 may also add a new header that indicates that the call originates from a specific service (e.g., IPIVR 184) that will override origination screening. IPIVR 184 may then forward the new or modified SIP Invite message to SSAS 170 (act 520).

SSAS 170 may then perform a data access point (DAP) lookup to resolve the 800 telephone number to identify a server and/or site which is configured to handle the toll free service for the telecommunication service provider (act 530). In this case, assume that SSAS 170 identifies a server associated with toll free service 192 as being the appropriate server. In some cases, an SSAS associated with services 190 or a redirect server may be identified as a proxy to which requests associated with toll free service 192 are forwarded. The SSAS or redirect server associated with services 190 may then allocate traffic among a number of individual servers associated with toll free service 192 in a manner similar to SSAS 170 described above. In each case, SSAS 170 may then insert an address in the SIP Invite message that identifies toll free service 192 and forwards the SIP Invite message to toll free service 192 or to the server/proxy handling calls to toll free service 192 (act 540).

Toll free service 192 receives the SIP Invite message and performs the desired services (e.g., connects the caller to the desired 800 number). In this manner, the telecommunication service provider associated with services 180 and 190 may act to perform inter-network routing to provide the desired services, even when the desired services reside on different platforms or portions of network 100.

As described briefly above, both SIP router 160 and SSAS 170 include logic for routing calls to the appropriate destinations, such as various autonomous systems and/or servers associated with a particular service, and balancing the load among the systems/servers. In an exemplary implementation, SIP router 160 and SSAS 170 may make "health" calculations to facilitate the routing decisions, as described in detail below.

FIG. 6 illustrates exemplary processing associated with health calculations performed by SSAS 170. Processing may begin by determining which servers are configured to provide services associated with each of services 180 and 190 (act 610). For example, for IPIVR service 184, a number of different servers may be used to provide the IPIVR service.

After identifying the various servers associated with the IPIRV service 184, SSAS 170 may determine which of the particular servers associated with IPIVR 184 are up and running (act 620). In this example, each server associated with IPIVR services 184 may include a number of individual components or processes, such as a resource manager, a media server, a service director, etc. If each of these components/processes are up and running at full capacity, the health calculation for this server may be 100% or fully available. In some implementations, SSAS 170 may poll the various servers/devices to determine whether they are up and running at full availability. In other instances, SSAS 170 may receive information regarding the status of the various devices/servers based on information received from other sources, such as devices which interact with IPIVR 184 to determine the health of the components.

In each case, if some of the components are running and others are not running, the health of the server may be downgraded to a certain percentage based on the particular components that are not running. For example, if a portion of a media server associated with an IPIVR server is not running, the overall health of that server may be degraded to, for example, 60% or some other percentage.

SSAS 170 may determine the health of each of the servers associated with other services 180 in a similar manner to generate a health indication value for each server (act 630). SSAS 170 may then store this information in service allocation database 330 (act 640). Similar calculations may be made for services 190 by, for example, an autonomous system associated with services 190 and the health indications for services 190 may be stored in service allocation database 330.

SIP router 160 may perform similar processing to determine the health of the various autonomous systems with which it communicates, such as SSAS 170, an autonomous system associated with services 190, or other components to which it forwards messages/traffic. Allocation logic 230 (FIG. 2) within SIP router 160 may then store this health/availability information and use this information when routing messages/traffic.

SIP router 160 and/or SSAS 170 may then use the updated availability/health information when routing data to avoid routing messages/data to systems/components that may be offline or in a degraded mode of operation. For example, if a particular server or autonomous system is down or in a degraded mode of operation, SIP router 160 and/or SSAS 170 may avoid routing traffic to that server/system. In this manner, SIP router 160 and/or SSAS 170 may make intelligent routing decisions based on the health/availability of the various devices at a particular time.

Implementations described herein provide for routing calls within a network. These calls may involve a number of different services. In addition, the calls may be routed based on the availability of various components and/or to balance the load on the various components.

The foregoing description of exemplary implementations provide illustration and description, but is not intended to be exhaustive or to limit the invention to the precise form disclosed. Modifications and variations are possible in light of the above teachings or may be acquired from practice of the invention. For example, various features have been described above with respect to SIP router 160 and SSAS 170. In some implementations, the functions performed by these two components may be performed by a single one of these components. In other implementations, some of the functions described as being performed by one of these components may be performed the other one of these components or another device/component.

In addition, while series of acts have been described with respect to FIGS. 4-6, the order of the acts may be varied in other implementations. Moreover, non-dependent acts may be implemented in parallel.

It will be apparent to one of ordinary skill in the art that various features described above may be implemented in many different forms of software, firmware, and hardware in the implementations illustrated in the figures. The actual software code or specialized control hardware used to implement the various features is not limiting of the invention. Thus, the operation and behavior of the aspects of the invention were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as a processor, a microprocessor, an application specific integrated circuit, or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
   a first device comprising:
      first logic configured to:
         receive a first session initiation protocol (SIP) invite message,
         identify a particular service associated with the first SIP invite message,
         identify a destination for the first SIP invite message using status information associated with a plurality of service selection servers, the status information comprising information identifying an availability associated with each of the plurality of service selection servers, and
         forward the first SIP invite message to the destination; and
   a service selection server comprising:
      a memory configured to store allocation information associated with a plurality of application servers, the allocation information comprising information identifying a percentage of data to forward to each of the plurality of application servers, and
      second logic configured to:
         receive the forwarded first SIP invite message from the first device,
         identify a first one of the application servers based on the first SIP invite message and the allocation information, and
         forward the first SIP invite message to the first application server.

2. The system of claim 1, further comprising:
   the first application server, the first application server being configured to:
      perform a service for a call associated with the first SIP invite message,
      identify a second service associated with the call,
      generate a second SIP invite message, the second SIP invite message including information in the first SIP invite message and additional information based on the identified second service, and
      forward the second SIP invite message.

3. The system of claim 2, further comprising:
   a second application server associated with the second service, the second application server configured to:
   receive the second SIP invite message, and
   perform a second service associated with the call.

4. A system comprising:
   a first device comprising:
      first logic configured to:
         receive a first session initiation protocol (SIP) invite message,
         identify a particular service associated with the first SIP invite message,
         identify a destination for the first SIP invite message using status information associated with a plurality of service selection servers, the status information comprising information identifying an availability associated with each of the plurality of service selection servers, and
         forward the first SIP invite message to the destination; and
   a service selection server comprising:
      a memory configured to store allocation information associated with a plurality of application servers, the allocation information comprising information identifying a percentage of data to forward to each of the plurality of application servers, and
      second logic configured to:
         receive the forwarded first SIP invite message from the first device,
         identify a first one of the application servers based on the first SIP invite message and the allocation information, and
         forward the first SIP invite message to the first application server, wherein the second logic is configured to favor the first application server over other ones of the plurality of applications servers with respect to forwarding the first SIP invite message when the first application server is located within a same physical site as the service selection server.

5. The system of claim 1, wherein the first device comprises a router.

6. A method, comprising:
receiving a session initiation protocol (SIP) invite message;
identifying a particular service associated with the SIP invite message;
identifying a destination device for the SIP invite message using status information associated with a plurality of servers;
forwarding the SIP invite message to the destination device;
receiving the forwarded SIP invite message at the destination device;
generating, at the destination device, allocation information associated with a plurality of application servers, the allocation information identifying a percentage of traffic to route to each of the plurality of application servers;
identifying a first one of a plurality of application servers based on the SIP invite message and the allocation information; and
forwarding the SIP invite message to the first application server.

7. The method of claim 6, further comprising:
performing a service for a call associated with the SIP invite message;
identifying a second service associated with the call;
generating a second SIP invite message, the second SIP invite message including information in the SIP invite message and additional information based on the second service; and
forwarding the second SIP invite message.

8. The method of claim 7, further comprising:
receiving the second SIP invite message at a second application server associated with the second service; and
performing a second service associated with the call.

9. The method of claim 7, wherein the generating a second SIP invite message comprises:
identifying an asserted identify field and a from field in the SIP invite message, and
including the asserted identify field and the from field in the second SIP invite message.

10. The method of claim 6, further comprising:
generating the status information associated with the plurality of servers.

11. The method of claim 10, wherein the generating status information comprises polling the plurality of servers to determine an availability measure associated with the plurality of servers.

12. The method of claim 6, wherein the generating the allocation information further comprises generating a value indicating a relative health of each of the plurality of application servers.

13. A method, comprising:
receiving a session initiation protocol (SIP) invite message;
identifying a particular service associated with the SIP invite message;
identifying a destination for the SIP invite message using status information associated with a plurality of servers;
forwarding the SIP invite message to the destination;
receiving the forwarded SIP invite message at the destination;
identifying a first one of a plurality of application servers based on the SIP invite message and allocation information associated with allocating traffic among the plurality of application servers; and
forwarding the SIP invite message to the first application server, wherein the identifying a first one of the plurality of application servers comprises:
favoring the first application server over other ones of the plurality of applications servers with respect to forwarding the SIP invite message when the first application server is located within a same physical site as the destination that received the SIP invite message.

14. A method, comprising:
receiving a request for voice over Internet protocol (VoIP) related services associated with a call;
identifying a destination for the request based on status information associated with a plurality of servers, the plurality of servers controlling access to a plurality of VoIP related services;
forwarding the request to the destination;
receiving the request at the destination;
identifying a first one of the plurality of VoIP related services based on the request;
determining allocation information associated with allocating traffic among a plurality of components capable of providing the first VoIP related service, the allocation information identifying a percentage of traffic to route to each of the plurality of components; and
forwarding the request to a first one of the components based on the allocation information.

15. The method of claim 14, further comprising:
identifying a second VoIP related service associated with the call;
generating a second request, the second request including information in the request and additional information identifying the second VoIP related service; and
forwarding the second request to a component associated with the performing the second VoIP related service.

16. The method of claim 14, further comprising:
generating the status information associated with the plurality of servers, the status information identifying at least one of an availability status or relative availability status.

17. The method of claim 16, further comprising:
generating the allocation information.

* * * * *